United States Patent [19]
Wolfer et al.

[11] Patent Number: 6,135,316
[45] Date of Patent: Oct. 24, 2000

[54] MEMORY STORAGE MEDIA DISK DUPLICATION SYSTEM HAVING A RECIPROCATING DISK DISPENSER

[76] Inventors: Dave Wolfer, 1624 Daily Ct., San Leandro, Calif. 94577; Wray H. Russ, 143 Lynn St., Brentwood, Calif. 94513

[21] Appl. No.: 09/036,572

[22] Filed: Mar. 6, 1998

[51] Int. Cl.[7] ................................. B65G 59/00
[52] U.S. Cl. ............................ 221/299; 369/69; 369/179; 369/183; 369/201; 414/798.1
[58] Field of Search ............................ 369/69, 178, 179, 369/183, 201, 75.2, 77.1, 192; 414/798, 798.1; 221/298, 299

[56] References Cited

U.S. PATENT DOCUMENTS

| | | | |
|---|---|---|---|
| 1,058,144 | 4/1913 | Blank | 221/298 |
| 2,296,013 | 9/1942 | Bell | 221/299 |
| 2,304,437 | 12/1942 | Bell | 221/299 |
| 4,195,961 | 4/1980 | Waiblinger | 414/120 |
| 4,278,258 | 7/1981 | Fujita et al. | 369/192 |
| 4,417,757 | 11/1983 | Morrison | 294/26 |
| 4,470,137 | 9/1984 | Tago | 369/100 |
| 4,504,186 | 3/1985 | Richards | 414/744 |
| 4,595,481 | 6/1986 | Allen et al. | 204/298 |
| 4,726,615 | 2/1988 | Goldberg | 294/16 |
| 4,735,540 | 4/1988 | Allen et al. | 414/222 |
| 4,921,397 | 5/1990 | Wantanabe | 414/788.4 |
| 5,067,702 | 11/1991 | Muraishi et al. | 414/798 |
| 5,110,167 | 5/1992 | Friend | 294/16 |
| 5,130,959 | 7/1992 | Wakatsuki et al. | 369/77.1 |
| 5,322,188 | 6/1994 | Dodaro | 221/298 |
| 5,397,214 | 3/1995 | Chueng | 414/796.7 |
| 5,505,509 | 4/1996 | Vance | 294/16 |
| 5,537,376 | 7/1996 | Ikuma | 369/75.2 |
| 5,583,839 | 12/1996 | Choi | 369/75.2 |
| 5,692,878 | 12/1997 | Freund | 414/719.6 |
| 5,734,629 | 3/1998 | Lee et al. | 369/34 |

OTHER PUBLICATIONS

Emedia Professional, "Buyers Guide to CD Duplication Systems—40 New towers autoloaders jukeboxes", Nov. 1997.

Primary Examiner—Christopher P. Ellis
Assistant Examiner—Joe Dillon, Jr.
Attorney, Agent, or Firm—Kevin H. Fortin

[57] ABSTRACT

A disk dispenser dispenses memory storage disks including CD's and the like. The disk dispenser includes an upper guide and a lower guide attached to the upper guide. The upper and lower guides are formed with axially offset openings. The lower guide has a rim for supporting a disk. A plate mounts between the lower guide and the upper guide. The plate has an arced edge for contacting a disk. The plate slides, causing the arced edge of the plate to dispense the disk through the opening in the lower guide.

19 Claims, 10 Drawing Sheets

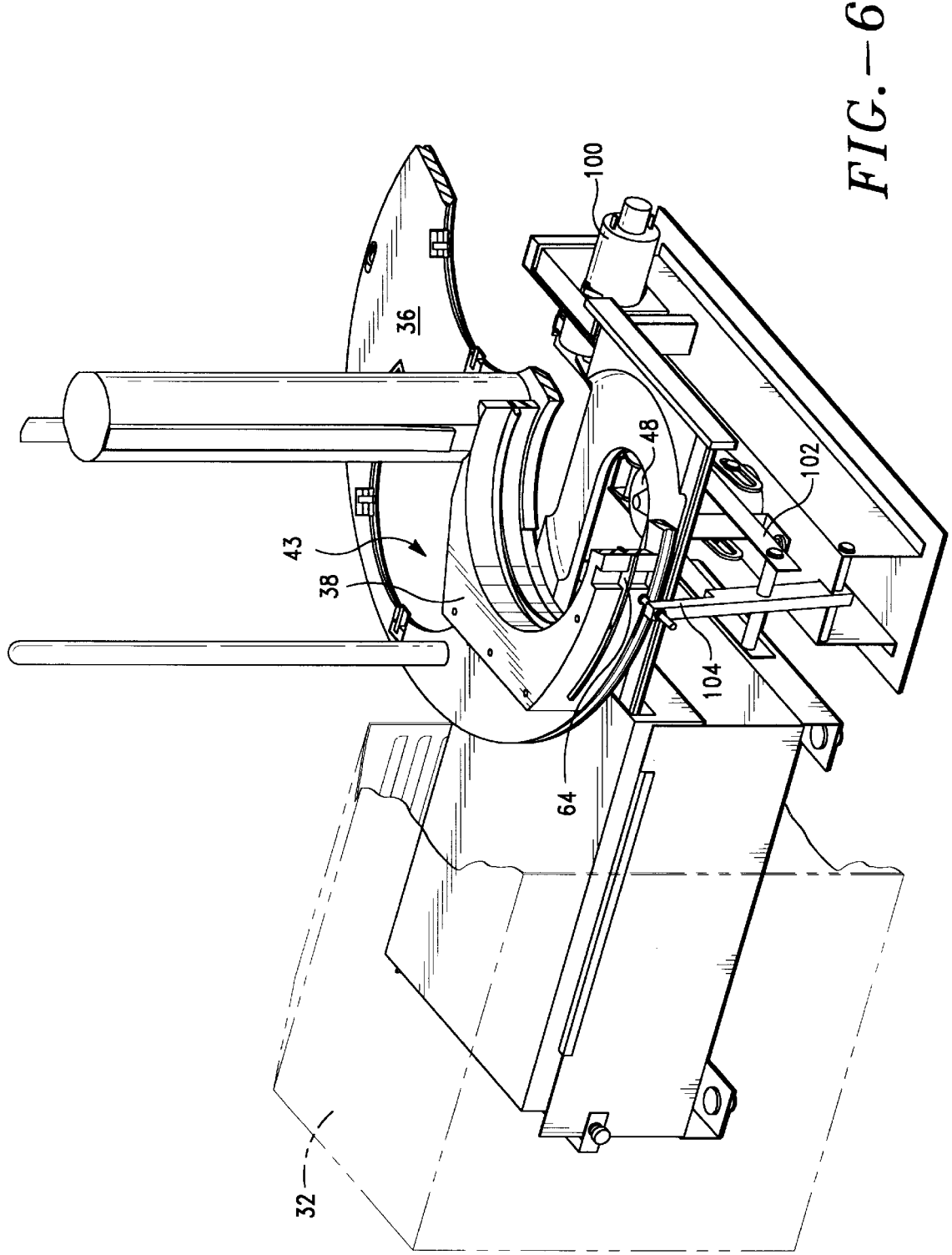

MEMORY STORAGE MEDIA DISK DUPLICATION SYSTEM HAVING A RECIPROCATING DISK DISPENSER

FIELD OF THE INVENTION:

This invention relates to disk handling systems and particularly to handling systems for memory storage disks such as compact disks (CD's).

BACKGROUND OF THE INVENTION:.

U.S. Pat. No. 4,726,615 to Goldberg includes a disk handling tool having a central plunger and two flexible arms. The central plunger inserts into a disk. Actuation of the central plunger spreads the arms around the outer edge of the disk. As the disk handling tool lifts, the arms automatically grip the disk on edge. The Goldberg tool is particularly suited to moving single disks to and from standard CD cases because the central plunger can actuate by pressing against the case. The Goldberg tool would be less viable when separating disks from a stack of disks where no disk case is present.

U.S. Pat. No. 5,505,509 to Vance includes a tool having a trigger, a spindle catch and a soft curved cup. Each disk has a central opening. The spindle catch inserts through the opening and aligns axially with respect to the disk. Actuation of the trigger axially misaligns the spindle catch. The disk is held between the spindle catch and the soft curved cup. One drawback of this tool is that because the spindle catch must insert through the disk, the Vance tool does not efficiently separate disks from a stack of disks.

U.S. Pat. No. 5,692,87 to Freund discloses a disk handling system which separates disks from a stack of disks. The Freund system is a double-gantry system. The double gantry system includes a lifting means, tapered shaft, a spring arm and a gripper.

The tapered shaft inserts centrally within a stack of disks. The spring arm is fixed relatively above the stack. The lifting means vertically lifts the stack against the spring arm. The spring arm offsets the uppermost disk from top of the stack. The gripper grasps the edge of the offset disk by its edge to move the disk from the top of the stack.

Double gantry systems, in general, have a large number of moving parts. These parts must be coordinated. The probability of wear and malfunction typically increases with each additional moving part. What is desired is a simple system which operates without much adjustment, and which reliably dispenses disks from a stack of disks.

SUMMARY OF THE INVENTION

A disk dispenser for dispensing disks from the bottom of a stack of disks includes an upper guide, a lower guide and a plate slidably mounted between the upper guide and the lower guide. The upper guide and lower guide define an opening. The plate slides to dispense disks through the lower guide opening.

According to one aspect of the invention, the opening of the upper guide is axially offset from the opening of the lower guide.

The lower guide attaches to the upper guide and includes a rim for supporting a disk. The plate has an arced edge for sliding disks between a first position where the lower guide rim supports the disk to a second position where the plate pushes the disk from the rim and thereby dispenses the disk through the opening in the lower guide. The arced edge of the plate defines an inner periphery which surrounds and circumscribes a disk.

The rim of the lower guide includes a support lip and an edge opposing the support lip. The support lip mounts on the inner periphery and extends into the opening. The opposing edge cooperates with the support lip to support a disk in the lower guide. When the lower guide supports a disk, and the plate moves from the first position to the second position, the plate pushes the disk off of the edge of the lower guide to dispense the disk.

This invention is particularly useful when mounted on a turntable as part of a system for duplicating disks.

BRIEF DESCRIPTION OF THE DRAWINGS

FIG. 6 shows a cutaway rear perspective view of the system of FIG. 1.

DETAILED DESCRIPTION

Figure 1:
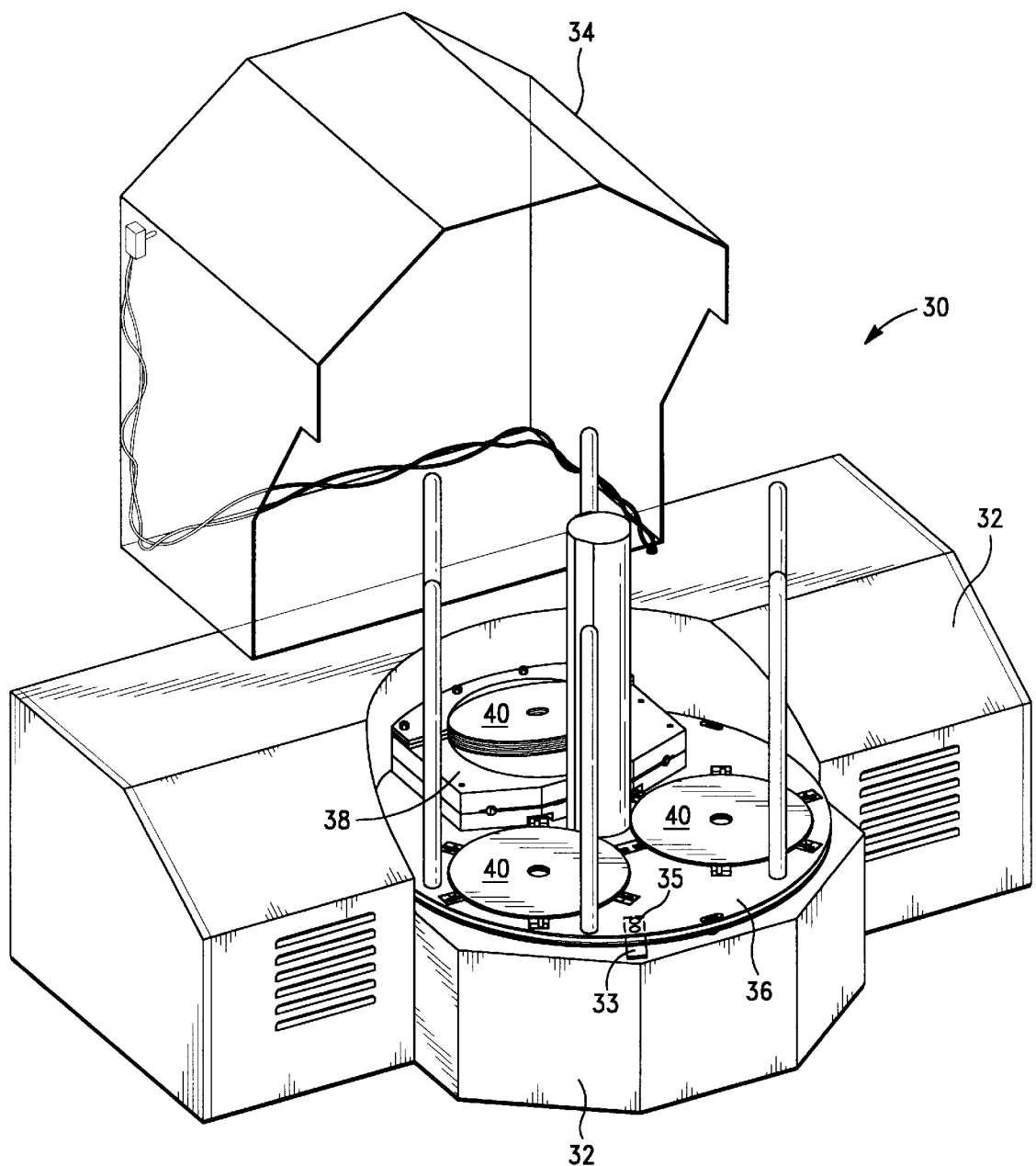
FIG. 1 is a perspective view of a disk duplication system in accordance with the present invention.

FIG. 1 shows a disk duplicator system, generally designated with the reference numeral 30. The system 30 includes a housing 32 with a cover 34, a turntable 36, and a disk dispenser 38. The turntable 36 includes several hoppers for feeding and accepting disks 40. The turntable 36 rotates to move the disks 40 along an arcuate path. The system 30 includes a sensor 33 mounted on a portion of the housing 32, adjacent the turntable 36.

The disk dispenser 38 dispenses disks 40 into the housing 32. The housing 32 encloses a recorder write data on the dispensed disks. The turntable 36 rotates to accept the data written disk in a selected hopper for temporary storage. Rotation of the turntable enables the disk dispenser 38 to dispense another disk into the housing 32, and the process of writing data to repeat.

The turntable 36 includes embedded magnets 35. The sensor 33 detects the magnets 35 to enable the system to recognize when the turntable 36 is in a desired rotational position with respect to the housing 32.

The present invention is particularly useful in conjunction duplicating data on memory storage disks 40. It can be appreciated, however, that a variety of media including or other optical or magnetic memory storage media may be dispensed and duplicated in accordance with the present invention.

Figure 2:
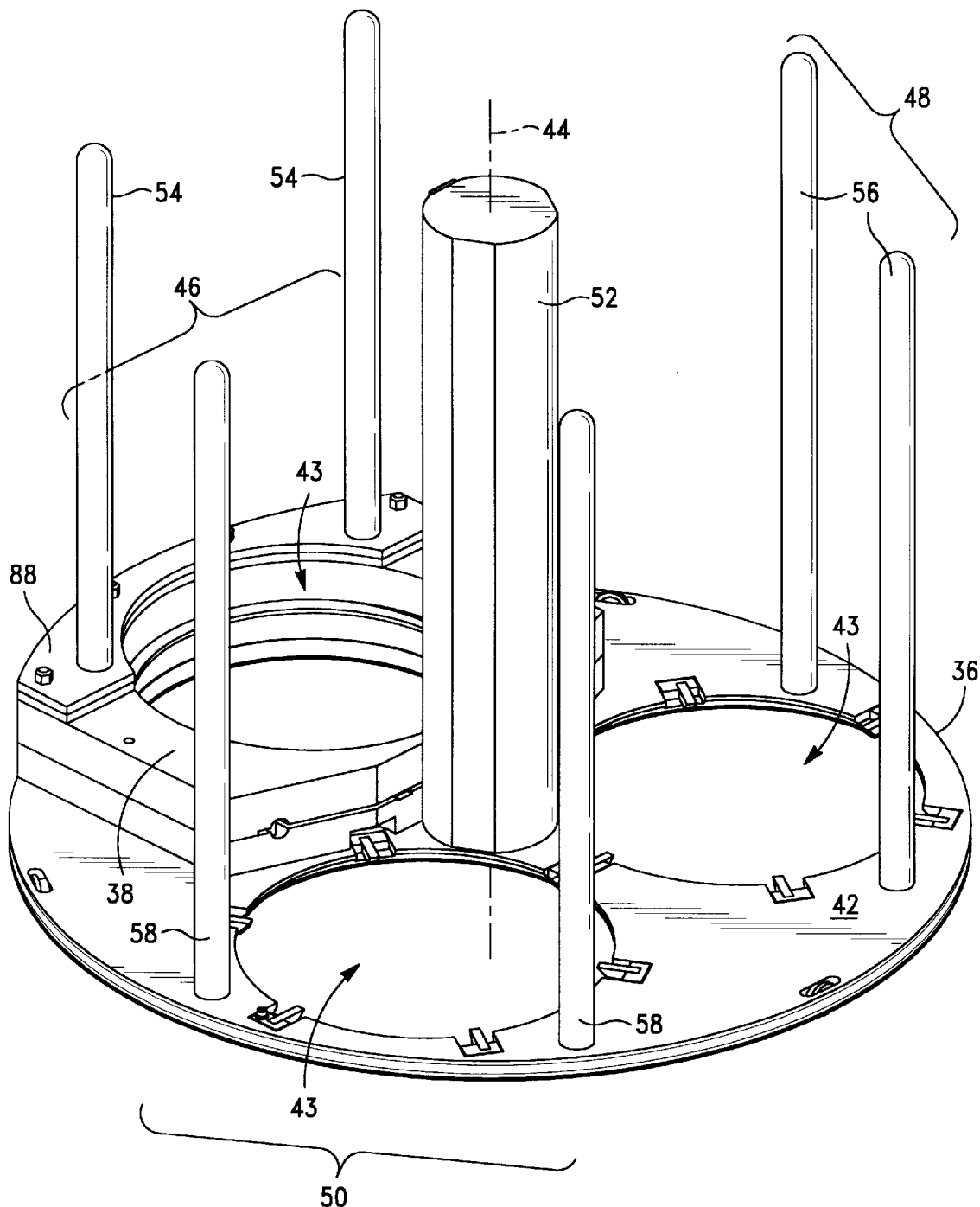
FIG. 2 is a perspective view of the turntable of FIG. 1.

FIG. 2 shows the turntable 36. The turntable 36 includes a central post 52, outer posts 54, 56 and 58, a surface 42 defining three openings 43. The turntable has an axis 44, a generally designated feed hopper 46, accept hopper 48, and reject hopper 50. The hoppers 46, 48 and 50 generally align adjacent a respective opening 43 to dispense or accept disks through each respective opening.

The disk dispenser 38 mounts on the turntable 36 adjacent one respective opening 43 to dispense disks through the turntable 36. The outer posts 54 cooperate with the central post 52 to define the hopper 46 which guides disks into the disk dispenser 38.

The central post 52 aligns with the turntable axis 44. The outer posts 54, 56 and 58 are positioned co-radially with respect to the turntable axis 44. The outer posts 56 and 58 cooperate with the central post 52 to surround the respective turntable openings 43 and to define the reject hopper 48 and accept hopper 50, respectively. Although outer posts 54, 56 and 58 cooperate with the central post 52 to define the hoppers 46, 48 and 50 and provide a light weight structure to guide disks, it can be appreciated that hoppers may assume any of a number of configurations. A hopper may be defined, for example, by a cylindrical wall, by a helical coil, or by another structure having a light weight design.

Figure 3:
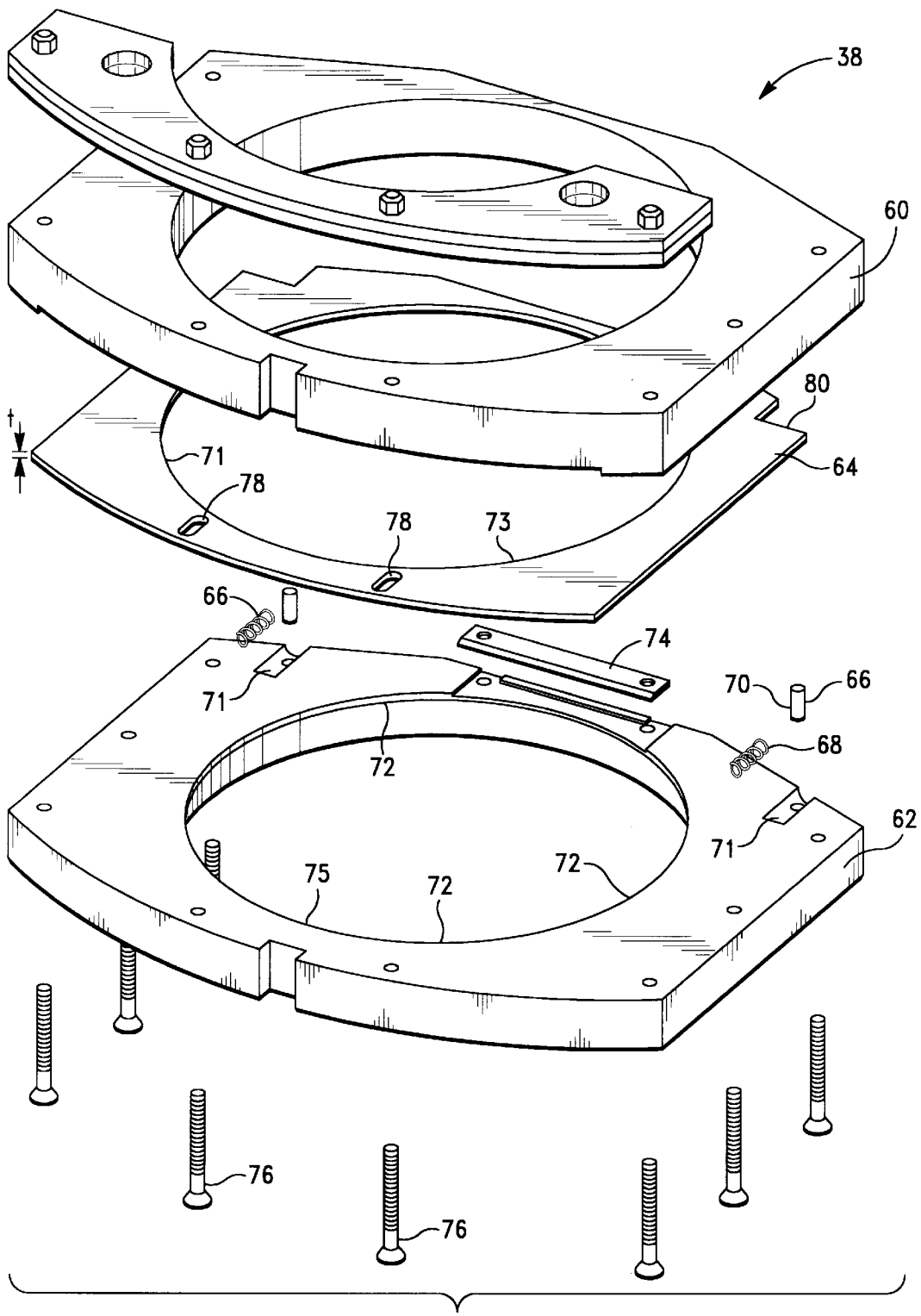
FIG. 3 is an exploded perspective view of the disk dispenser of FIG. 1.

FIG. 3 shows an exploded view of the disk dispenser, generally designated 38. The disk dispenser 38 includes an upper guide 60, a lower guide 62 and a plate 64. The lower guide 62 includes a spring 68, a rim 72, a support lip 74, an opposing edge 75, and fasteners 76. The plate 64 includes an arced edge 71. The arced edge 71 defines an inner periphery 73. The inner periphery 73 defines an opening for surrounding a disk. Preferably, the inner periphery 73 is circular for circumscribing a disk. The inner periphery 73 is configured with a beveled edge for separating single disks from a stack of disks.

The upper guide 60, the lower guide 62 and the plate 64 each define a generally circular opening to enable a disk to pass through the disk dispenser 38. Each opening is sized for a disk to pass through when the disk parallels the plate 64. The upper guide 60 and the lower guide 62 are axially offset from each other so that a portion of the rim 72 of lower guide 62 stops disks which may fall thorough the upper guide 60 towards the lower guide 62. The opposing edge 75 diametrically opposes the support lip 74. The support lip 74 cooperates with the opposing edge 75 to hold a disk on the lower guide 62. The plate 64 slidably mounts between the upper guide 60 and the lower guide 62 to selectively pass disks stopped by the lower guide 40 through the lower guide 62.

The pin 70 extends between the lower guide 62 and the upper guide 60 to retain the spring 68. The plate 64 includes a pair of holes 78 which align with respective fasteners 76. The fasteners 76 extend through the upper guide 60, the plate 64 and the lower guide 62 to hold the upper guide 60 and the lower guide 62 together. The fasteners 76 retain the plate 64 between the upper guide 60 and the lower guide 62. The fasteners 76 align the plate 64 relative to the upper guide 60 and the lower guide 62 when the plate 64 slides.

The lower guide 62 includes a groove 71. The spring 68 is a coil spring having two ends. The spring 68 lies in the groove 71. The pin 70 inserts perpendicularly into the groove 71. Accordingly, one end of the spring 68 contacts the pin 70. The spring 68 biases the plate 62 in a desired position. According to one aspect of the invention, the spring 68 offsets the plate 62 from the lower guide 62 to enable the lower guide 62 to support a disk.

The plate 64 has a shoulder with an edge 80. The edge 80 contacts the other end of the spring 68. The spring 68 biases the plate 64 into a desired position relative to the lower guide 62. When the plate 64 slides towards the pin 70, the spring 68 dampens movement of the plate 64. The plate 64 has a generally uniform thickness "t". The thickness "t" approximates the thickness of an individual disk to be dispensed so that when the plate 64 slides, only one disk is dispensed.

Figure 4:
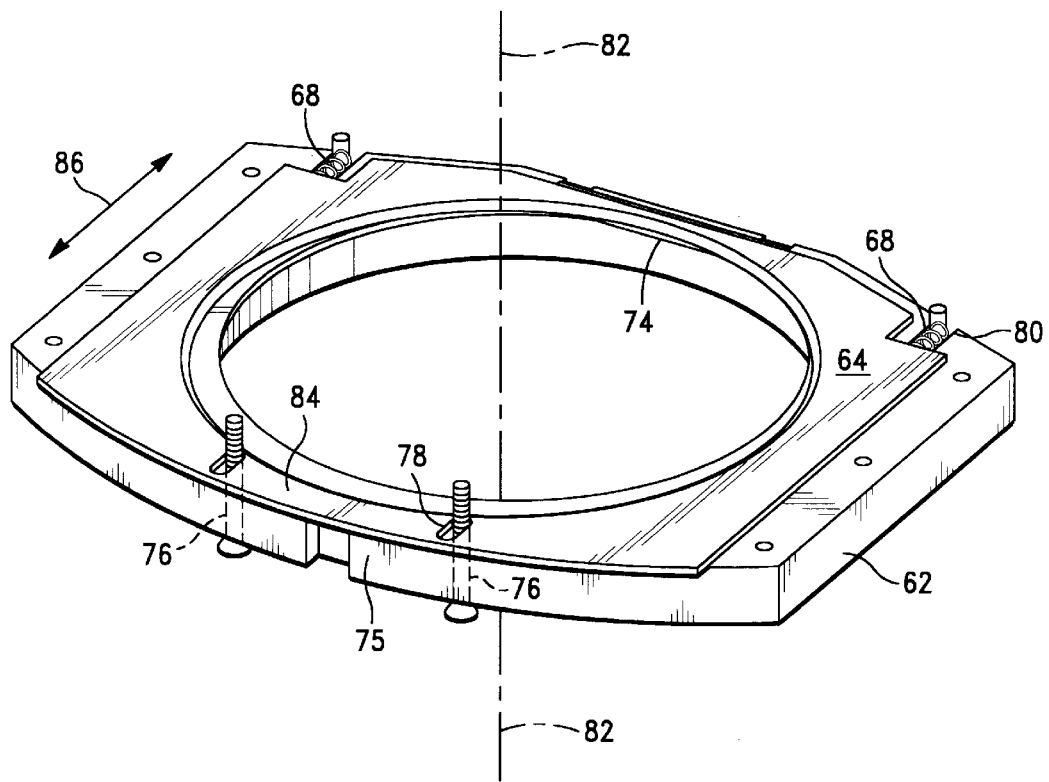
FIG. 4 is a perspective view of a portion of the dispenser of FIG. 3.

FIG. 4 is a perspective view of the plate 64 and the lower guide 62. The plate 64 reciprocates with respect to the lower guide in the directions of the arrows 86. The lower guide 62 opening defines an axis 82. The spring 68 biases the plate 64 so that the plate opening is axially offset from the lower guide opening. Offsetting the plate 64 opening from the lower guide 62 opening enables the support lip 74, in cooperation with the opposing edge 75, to hold a disk on the lower guide 62. The plate 64 circumscribes a disk when the disk is on the lower guide 62. The plate 64 slides towards the springs 68 to dispense a disk through the lower guide 62 opening. The springs 68 reciprocate the plate 64.

Figure 5:
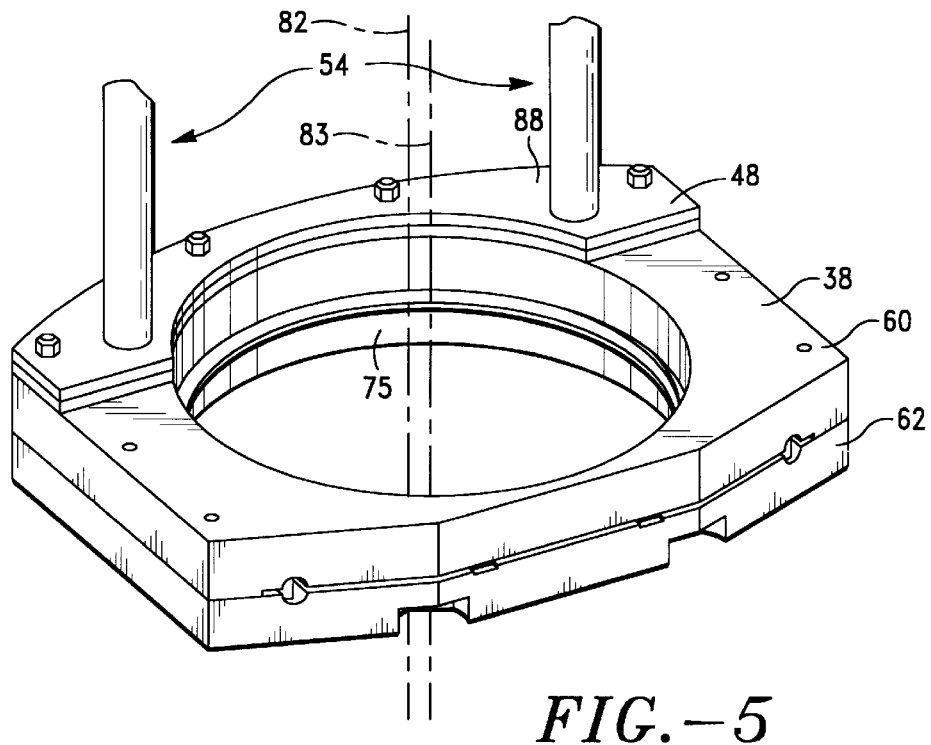
FIG. 5 is a perspective view of the disk dispenser of FIG. 3 and a portion of a feed hopper.

FIG. 5 is a perspective view of the disk dispenser 38 attached to the feed hopper 46. The feed hopper 46 is configured with a reinforcement plate 88 which bolts to the upper guide 60. The outer posts 54 mount on the reinforcement plate 88. Accordingly, the feed hopper attaches to the disk dispenser. The reinforcement plate 88 inhibits flexion of the disk dispenser 38 while supporting the feed hopper 46 (see FIG. 2).

The upper guide 60 has an opening with an axis 83. The axis 82 of the lower guide 62 opening is axially offset from the axis 83 of the upper guide 60 opening.

FIG. 6 shows a cutaway rear perspective view of the housing 32. The housing 32 includes a motor 100, a mechanical linkage 102, the elevator pin 98 and an arm 104. The arm 104 and the elevator pin 98 are connected via the mechanical linkage 102 to the motor 100. The motor 100 actuates the mechanical linkage 102 to cause the arm 104 to slide the plate 64 and to lift and lower the elevator pin 98. Movement of the linkage 102 and rotation of the turntable 36 dispense disks, one at a time, from the dispenser 38 onto the elevator pin 98. Movement of the linkage 102 may also insert disks, one at a time, through the opening 43 in the turntable 36 when the turntable 36 rotates.

Figure 7:
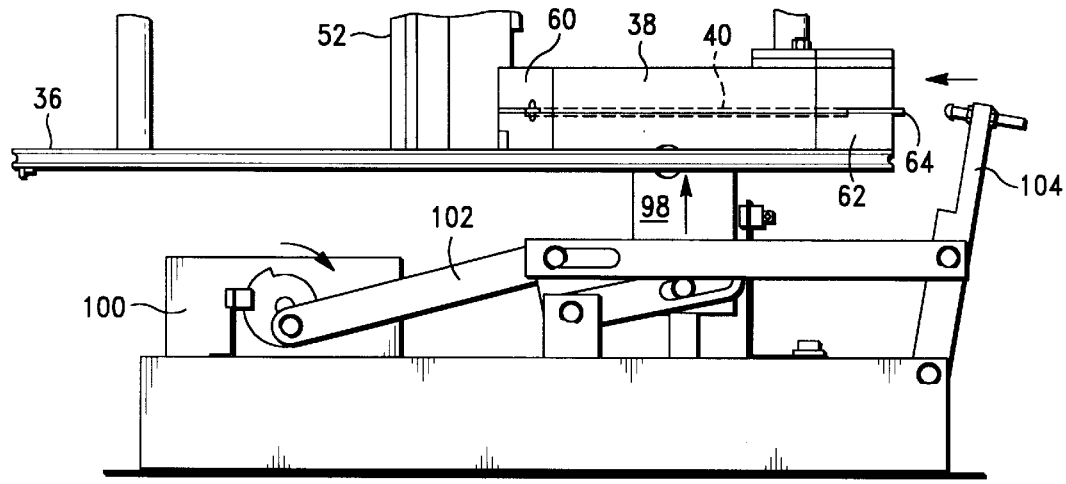
FIG. 7, FIG. 8, and FIG. 9 are side views, in sequence, of the elevator pin moving a disk from the turntable of FIG. 1.

FIG. 7 shows a side view of the disk dispenser 38, the turntable 36 and the linkage 102. The motor 100 actuates the linkage 102. The linkage 102 elevates the elevator pin 98 towards the turntable 36 and moves the arm 104. The arm 104 moves towards the plate 64 of the disk dispenser.

Figure 8:
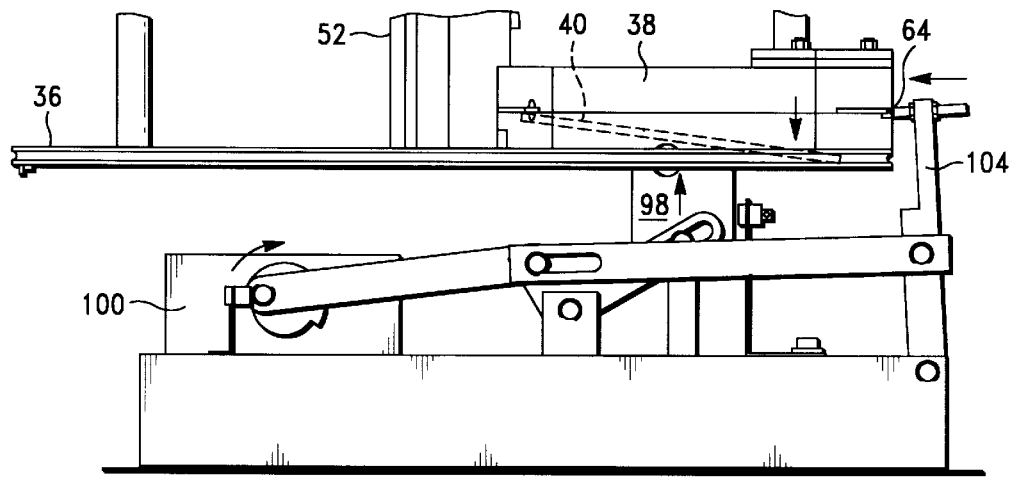

FIG. 8 shows further movement of the linkage 102. The arm 104 presses against the plate 64 to slide the plate 64. Sliding the plate 64 relative to the upper guide 60 and the lower 62 guide causes the dispenser 38 to drop the disk 40 onto the elevator pin 98.

Figure 9:
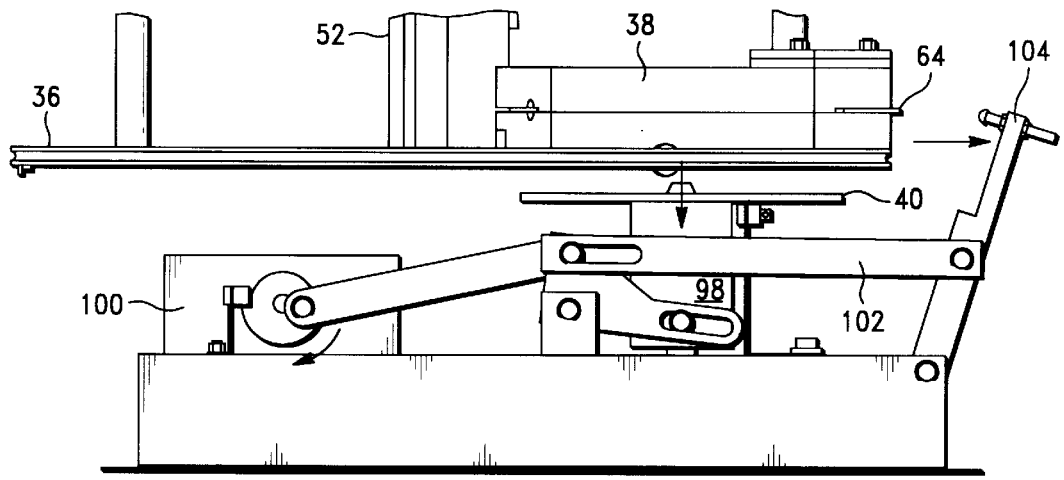

FIG. 9 shows further movement the linkage 102. The elevator pin 98 retracts from the dispenser 38. The arm 104 simultaneously withdraws from the dispenser 38. The elevator pin 98 lowers the dispensed disk 40 away from the dispenser 38.

A single elevator pin cycle is completed when the elevator pin 98 retracts and the arm 104 withdraws. At this point in the cycle, the turntable 36 rotates. Rotation of the turntable 36 enables a subsequent cycle of the elevator pin 98 to lift the disk 40 back onto the turntable 36, for example.

Figure 10:
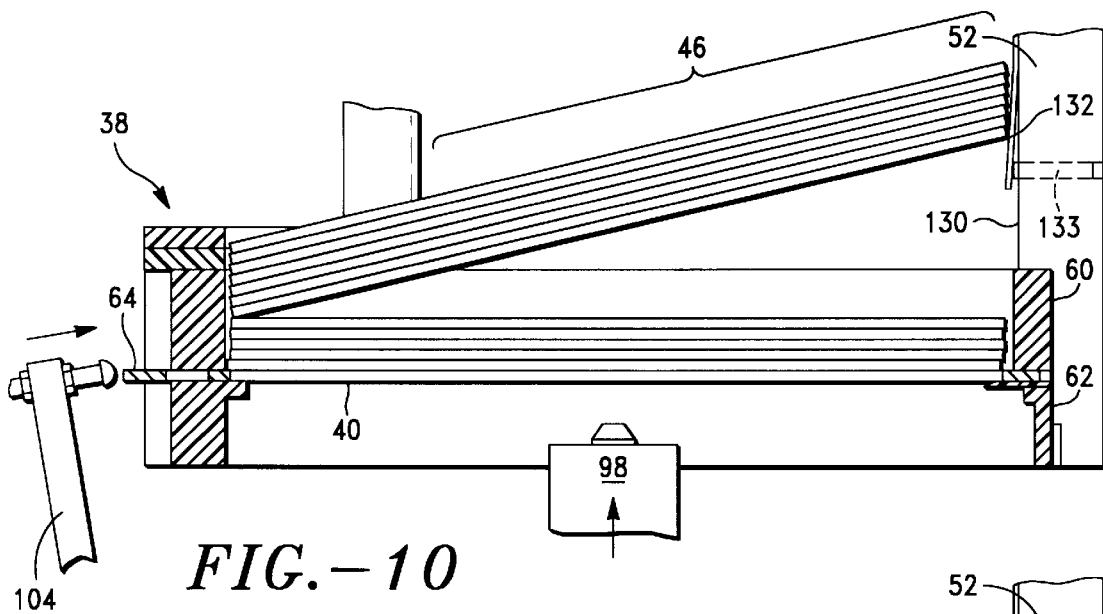
FIG. 10, FIG. 11 and FIG. 12 correspond with FIG. 7, FIG. 8 and FIG. 9, respectively, and show partial cross-sectional views of the disk dispenser from a reversed angle.

FIG. 10 shows the arm 104 moving towards the plate 64. The support lip 74 and the opposing edge 75 of the lower guide 62 support the disk 40. The elevator pin 98 moves towards the dispenser 38 and the arm 104 moves towards the plate 64. Preferably, the upper guide 60 holds from 4–6 disks in parallel with the plate. The three hoppers are each adapted to hold between 100–150 disks.

The central post 52 of the feed hopper 46 includes a recessed portion 130, an extended portion 132 and an adjustable set screw 133. The recessed portion 130 is adjacent the upper guide 60 to feed disks, in horizontal alignment with the plate 64, from the feed hopper 46 to the upper guide 60. The set screw 133 rotatably extends through the central post 52 to adjust the distance at which the extended portion 132 extends from the central post 52 and insures proper feeding of disks from the feed hopper 46 to the upper guide 60.

The extended portion 132 angles disks stacked in the feed hopper 46 with respect to the plate 64. Angling disks within the feed hopper 46 minimizes forces caused by disk weight on the disk dispenser 38, and particularly on the plate 64. Minimizing such forces enables multiple disks to be stacked in the feed hopper 46 and optimizes reliability of the disk dispenser.

Figure 11:
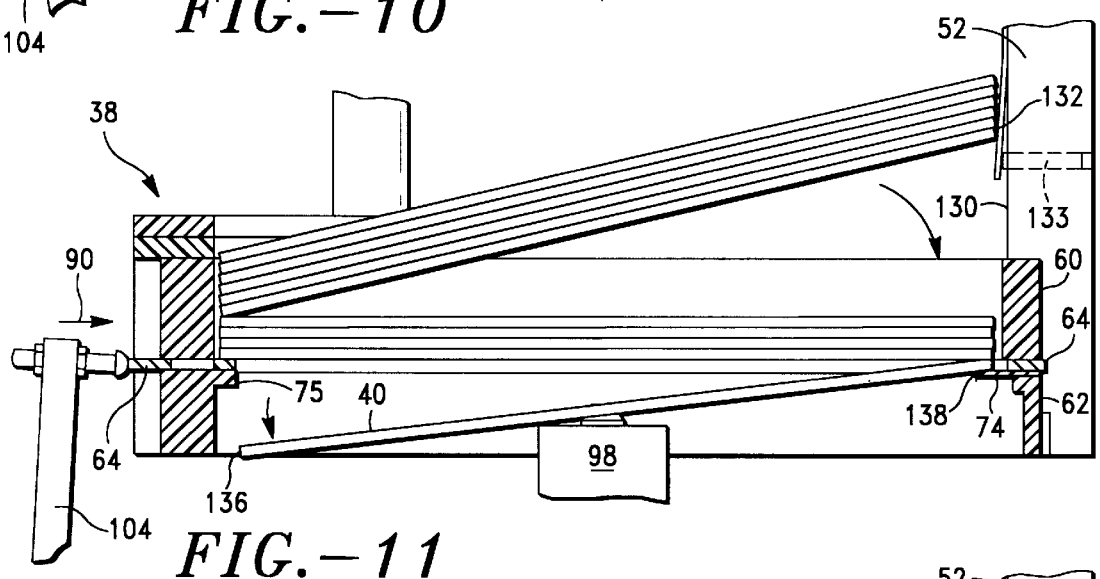

FIG. 11 shows the arm 104 contacting the plate 64. The disk 40 has two opposing edges 136 and 138. The arm 104 contacts the plate 64 to slide the plate 64 in the direction of the arrow 90. The plate 64 urges the edge 136 of the disk 40 off of the edge 75 of the lower guide 62. Reciprocation of the plate 64 urges the other edge 138 of the disk 40 off of the support lip 74 so that the disk 40 falls from the lower guide 60 onto the elevator pin 98.

Figure 12:
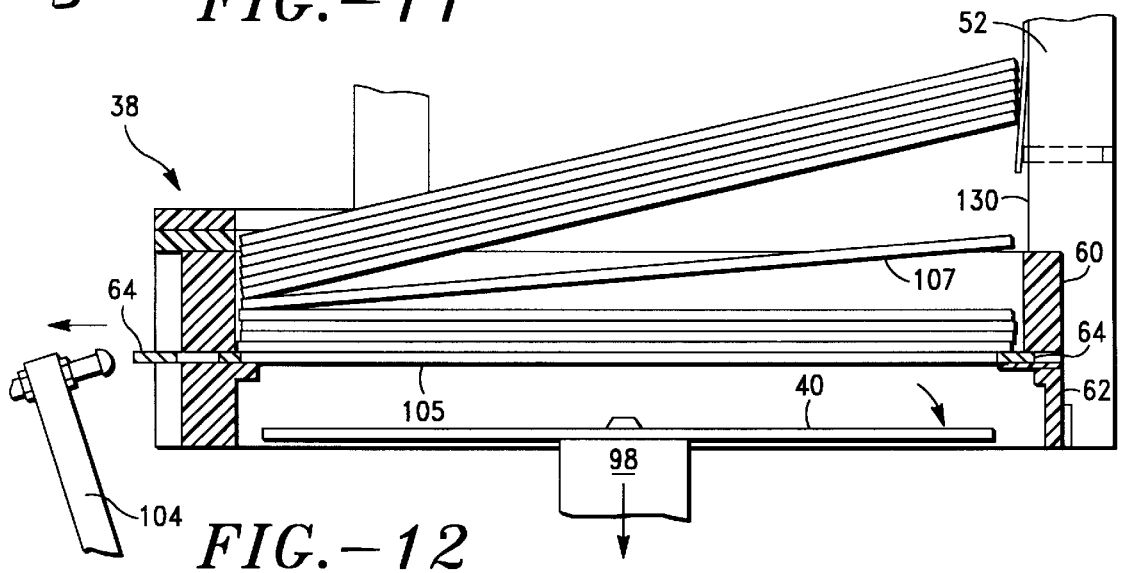

FIG. 12 shows the arm 104 withdrawn from the plate 64. The plate 64 automatically reciprocates as the arm 104 withdraws. The plate 64 guides the next disk 105 onto the lower guide 62. Movement of the next disk 105 onto the lower guide 62 causes another disk 107 to fall from the hopper into the upper guide 60.

Figure 13:
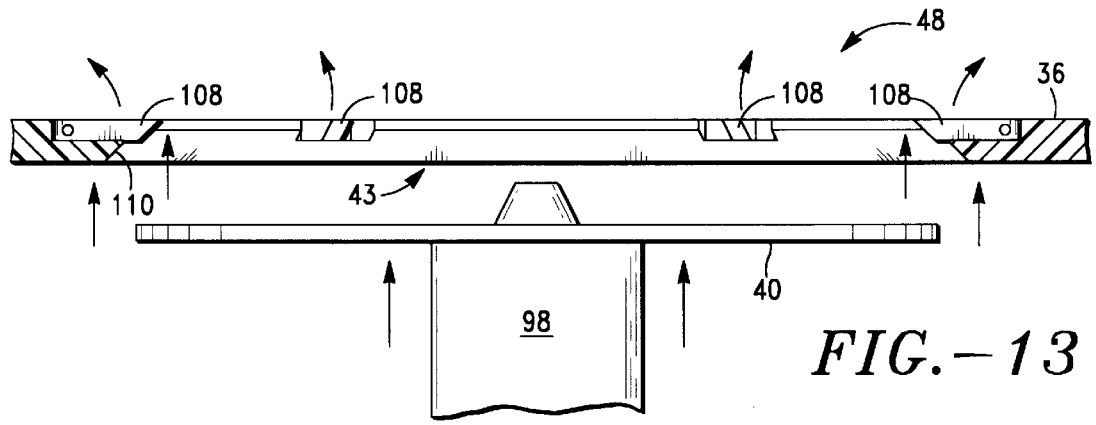
FIG. 13, FIG. 14, and FIG. 15 shows a cross-sectional side view of the elevator pin lifting a disk.

FIG. 13 shows the elevator pin 98 lifting the disk 40 towards the turntable 36 from below the opening 43 of the accept hopper 48. The turntable defines the opening 43 to enables disks to pass into the accept hopper from beneath the turntable 36. The turntable 43 includes a periphery 110 surrounding the opening 43. A plurality of disk clips 108 mount on the periphery 110. The disk clips 108 function to allow the disk 40 to move through the turntable 36 into the accept hopper in only one direction, in the direction of the arrow 106.

Figure 14:
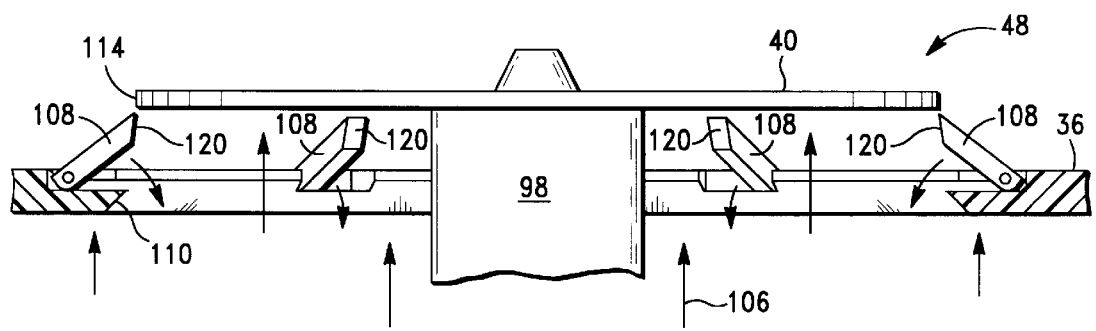

FIG. 14 shows the elevator pin 98 lift the disk 40 in the direction of the arrows 106 above the turntable 36. The elevator pin 98 passes through the turntable 36 with the disk 40. The disk 40 lifts the disk clips 108 as the disk 40 passes through the turntable 36. The disk 40 has an outer edge 114. The disk clips have ends 120. As the elevator pin 98 passes through the turntable, the outer edge 114 of the disk contacts the ends 120 of the disk clips 108.

The ends 120 of the disk clips 108 are angled to contact primarily the outer edge 114 of the disk 40. The angled ends 120 align the disk 40 in parallel with the turntable 36 as the disk passes through the turntable 36. This alignment insures that the disk 40 will not flutter on the elevator pin 98 when the elevator pin 98 lifts the disk through the turntable 36. The elevator pin 98 reciprocates to place the disk 40 on to the disk clips 108.

Figure 15:
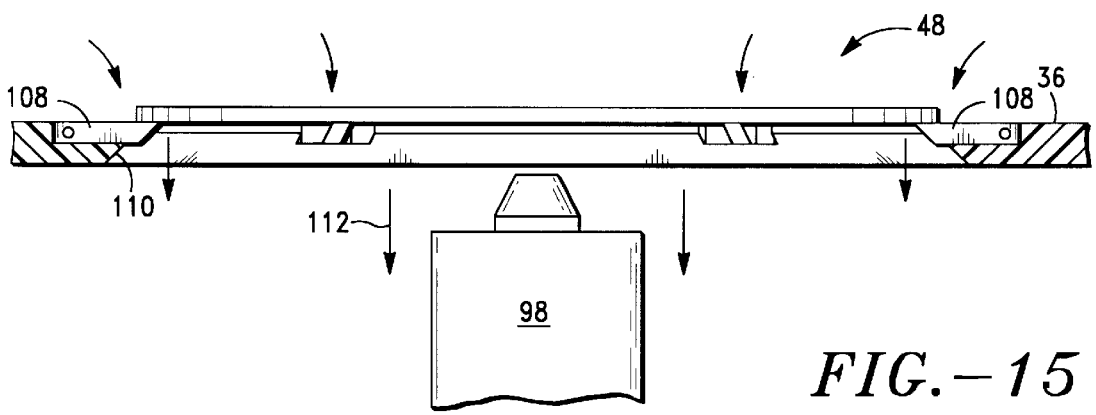

FIG. 15 shows the elevator pin 98 reciprocating in the direction of the arrows 112. The disk clips 108 extend radially towards the center of the opening 110. The elevator pin drops the disk 40 on the disk clips 108 so that the disk clips support the outer edge 114 of the disk 40. The disk clips 108 align with the turntable 36 to support the disk 40 on the turntable 36. The disk clips 108 can support a stack of disks.

It can be appreciated that by repeating the process shown in FIG. 13, FIG. 14 and FIG. 15 that elevator pin stacks multiple disks on the disk clips 108 via the turntable opening 110 from beneath the turntable 36. Preferably, when the disk clips 108 support a stack of disks, the elevator pin 98 is strong enough to lift the stack of disks supported when the elevator pin 98 lifts a disk through the turntable 36.

Figure 16:
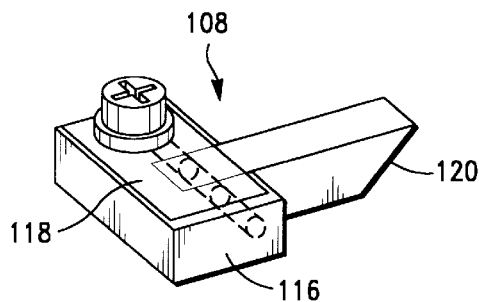
FIG. 16 and FIG. 17 show a disk clip in accordance with FIG. 15 and FIG. 14, respectively.

FIG. 16 shows a disk clip 108. The disk clip 108 includes a hinge 116, a spring 118 and the angled end 120. The spring 118 includes a strip of resilient material which covers a portion of the disk clip 108 to bias the disk clip 108 in the configuration shown.

Figure 17:
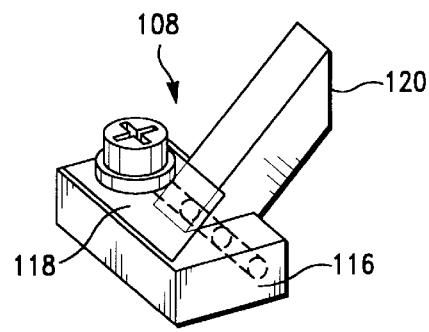

FIG. 17 shows the disk clip 108 rotated about the hinge 116. The disk clip 108 extends at an angle with respect to the hinge 116. The spring 118 flexes and the beveled edge 120 aligns perpendicularly to the hinge 116 and to the turntable surface, see FIG. 13.

Figure 18:
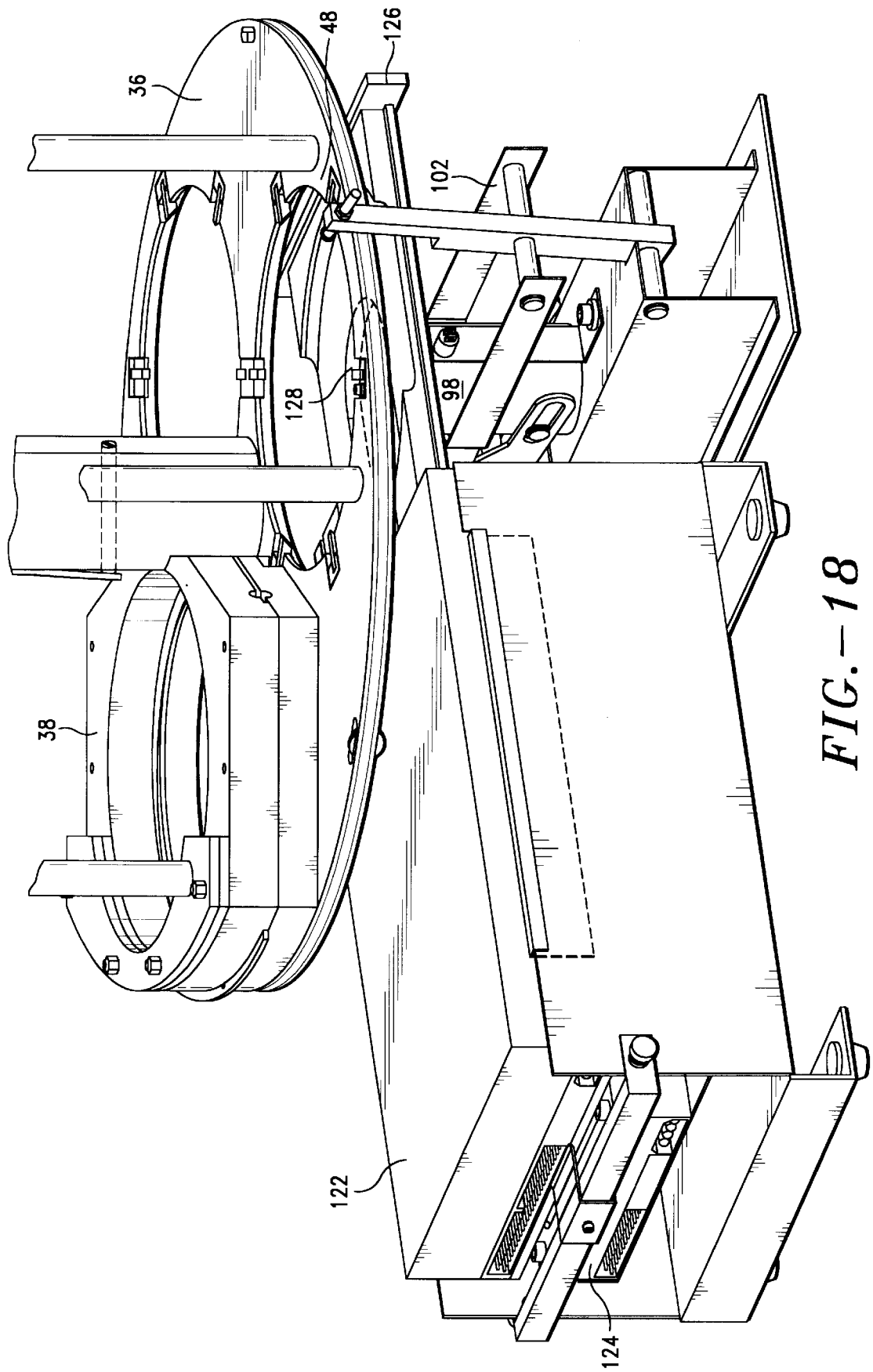
FIG. 18 is a perspective view of a disk recorder positioned in an operative arrangement with respect to the turntable and linkage mechanism in accordance with the present invention.

FIG. 18 shows the turntable 36, a recorder 122, a hard drive 124, the elevator pin 98, and the mechanical linkage 102. The recorder 122 includes a tray 126. The tray 126 automatically extends from the recorder 122 to interpose a disk between the elevator pin 98 and the turntable 36, or to catch a disk which is dispensed from the disk dispenser 38. The tray 126 includes an opening 128 to enable the elevator pin 98 to extends through the turntable 36, via the tray 126. The hard drive 124 couples with the recorder 122 to deliver data to be written. A controller including a circuit board within the housing regulates operation of the hard drive 124, the recorder 122, the linkage 102 and the turntable 36. According to one aspect of the invention, the recorder 122 is a CD-R or Compact Disk Recorder. It can be appreciated that the housing 32 of FIG. 1 encloses the recorder 122, the hard drive 124, the pin 98 and the linkage 102. The recorder 122 in combination with the disk dispenser 38, turntable 36 and the elevator pin 98 enables duplication of recordable CD's.

Figure 19:
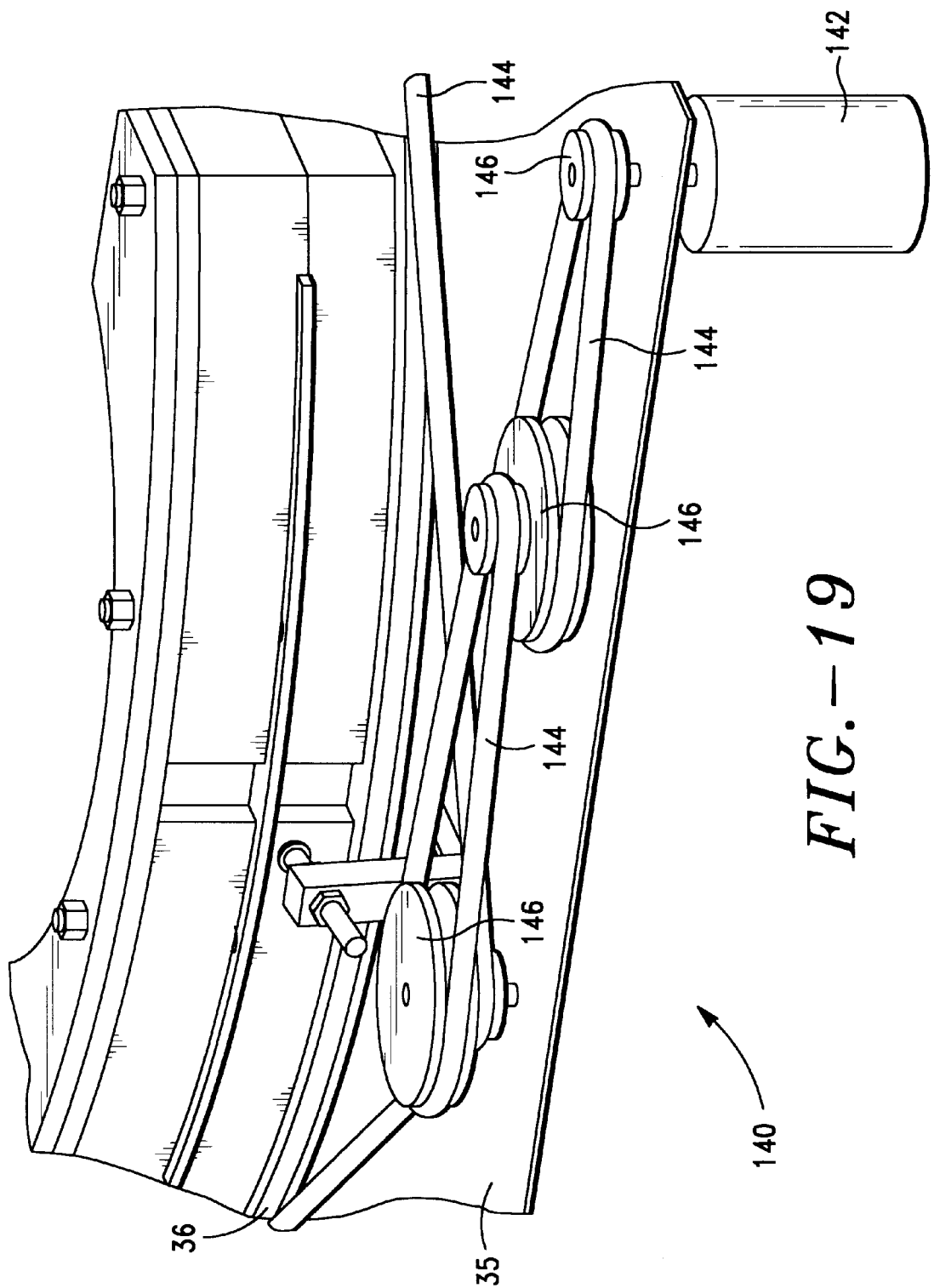
FIG. 19 is a perspective view of the drive linkage for the turntable of FIG. 1.

FIG. 19 is a perspective view of a portion of the linkage assembly, generally designated 140, which rotates the turntable 36 in accordance with the present invention. The drive linkage assembly 140 mounts on a portion of the housing 32. The assembly 140 includes a motor 142, belts 144, and pulleys 146. The belts 144 and pulleys 146 operate to selectively rotate the turntable 36 at a desired rate.

This detailed description describes but one embodiment of the present invention. It can be appreciated that this description is not limiting of the present invention. For example, the hoppers may be configured in any manner consistent with holding disks. Additionally, the disk dispenser may be configured any of a number of ways which enable a sliding plate, arm or prod to separate and dispense disks. With these and other variations in mind, the invention is to be limited only by the following claims.

We claim:

1. A memory storage media disk duplication system having a reciprocating disk dispenser, comprising:

a housing having at least one hopper for stacking memory storage media disks;

a disk dispenser attached to the hopper for dispensing one disk at a time from the hopper;

a means for writing digital data to a memory storage media disk;

a means for conveying memory storage media disks from the disk dispenser to the memory storage disk writer;

the disk dispenser having:

an upper guide;

a lower guide attached to the upper guide, the lower guide includes a rim for supporting a disk, the rim defines an opening;

a plate mounted between the lower guide and the upper guide, the plate slides between a first position and a second position to dispense disks through the opening.

2. A disk dispenser as set forth in claim 1, wherein when the plate has an arced edge for dispensing disks.

3. A disk dispenser as set forth in claim 1, wherein when the arced edge defines an inner periphery for circumscribing a disk.

4. A disk dispenser as set forth in claim 3, wherein the rim of the lower guide includes a support lip mounted on the inner periphery and extending into the opening for supporting a disk.

5. A disk dispenser as set forth in claim 4, wherein the rim has an opposing edge, which opposes the support lip and cooperates with the support lip to support a disk in the lower guide.

6. A disk dispenser as set forth in claim 4, wherein the rim has an opposing edge, which opposes the support lip and cooperates with the support lip to support a disk in the lower guide, when the lower guide supports a disk and the plate moves from the first position to the second position the plate pushes the disk off the opposing edge to dispense the disk.

7. A memory storage media disk duplication system having a reciprocating disk dispenser, comprising:

a housing having at least one hopper for stacking memory storage media disks;

a disk dispenser attached to the hopper for dispensing one disk at a time from the hopper;

a means for writing digital data to a memory storage media disk;

a means for conveying memory storage media disks from the disk dispenser to the memory storage disk writer;

the disk dispenser having:
an upper guide;
a hopper attached to the upper guide, for holding multiple disks and feeding disks to the upper guide;
a lower guide being attached to the upper guide, the lower guide includes a rim for supporting a disk, the rim defines an opening;
a plate mounted between the lower guide and the upper guide, the plate has an arced edge and slides between a first position and a second position to dispense disks from the lower guide.

8. A disk dispenser as set forth in claim 7, wherein reciprocation of the plate dispenses a disk from the rim of the lower guide and feeds another disk onto the rim.

9. A disk dispenser as set forth in claim 7, wherein the lower guide includes a spring, the spring contacts the plate to bias the plate in the first position, wherein the plate surrounds a disk in the first position.

10. A disk dispenser as set forth in claim 7, wherein the lower guide includes fasteners and the plate includes holes, the fasteners attach the lower guide to the upper guide, extending though the holes in the plate.

11. A disk dispenser as set forth in claim 7, wherein the lower guide includes, springs, grooves and pins extending perpendicularly from the grooves, the springs lie in the grooves, each spring has an end which contacts one pin, each spring has another end which contacts the plate to bias the plate in the first position.

12. A disk dispenser as set forth in claim 7, wherein the lower guide includes fasteners and the plate includes oval-shaped holes, the fasteners attach the lower guide to the upper guide, extending though the holes in the plate, the fasteners cooperate with the holes to guide the plate between the first position and the second position.

13. A disk dispenser as set forth in claim 12, wherein the lower guide opening is axially offset from the upper guide opening by between 1 mm–10 mm.

14. A disk dispenser as set forth in claim 7, wherein the rim of the lower guide includes a support lip which extends into the opening of the lower guide for supporting a disk in the lower guide.

15. A disk dispenser as set forth in claim 14, wherein the support lip includes a flat strip.

16. A disk dispenser as set forth in claim 14, wherein the support lip includes a flat strip with a tapered edge extending linearly between two points on the rim.

17. A memory storage media disk duplication system having a reciprocating disk dispenser, comprising:

a housing having at least one hopper for stacking memory storage media disks;

a disk dispenser attached to the hopper for dispensing one disk at a time from the hopper;

a means for writing digital data to a memory storage media disk;

a means for conveying memory storage media disks from the disk dispenser to the memory storage disk writer;

the disk dispenser having:
an upper guide defining a circular opening and having a central axis;
a lower guide being attached to the upper guide, the lower guide includes a rim for supporting a disk, the rim defines a circular opening and a central axis;
the lower guide being axially offset from the upper guide;
a plate mounted between the lower guide and the upper guide, the plate has an arced edge for contacting disks, the plate slides between a first position and a second position to dispense disks through the lower guide.

18. A disk dispenser as set forth in claim 17, wherein the lower guide opening and upper guide opening are of generally equal diameter.

19. A disk dispenser as set forth in claim 17, wherein the plate includes an inner periphery, the inner periphery being beveled to dispense one disk at a time.

* * * * *